US010588295B1

(12) United States Patent
Riley

(10) Patent No.: US 10,588,295 B1
(45) Date of Patent: Mar. 17, 2020

(54) VARIABLE POWER SOURCE ATTACHMENT FOR CORRECTIONAL ANIMAL COLLAR

(71) Applicant: Thomas R Riley, Greenwood, SC (US)

(72) Inventor: Thomas R Riley, Greenwood, SC (US)

( * ) Notice: Subject to any disclaimer, the term of this patent is extended or adjusted under 35 U.S.C. 154(b) by 358 days.

(21) Appl. No.: 15/703,967

(22) Filed: Sep. 13, 2017

(51) Int. Cl.
  *G08B 21/00* (2006.01)
  *A01K 15/02* (2006.01)
  *A01K 27/00* (2006.01)

(52) U.S. Cl.
  CPC .......... *A01K 15/021* (2013.01); *A01K 27/009* (2013.01)

(58) Field of Classification Search
  CPC ............................ A01K 15/021; A01K 27/009
  USPC ...................................................... 340/573.3
  See application file for complete search history.

(56) References Cited

U.S. PATENT DOCUMENTS

| 4,399,432 A * | 8/1983 | Lunn | G08B 21/0415 340/573.3 |
| 2003/0122678 A1 * | 7/2003 | Duncan | A01K 15/021 340/573.3 |
| 2005/0241926 A1 * | 11/2005 | Groh | A01K 15/021 200/50.2 |
| 2005/0257752 A1 * | 11/2005 | Langer | A01K 15/021 119/712 |
| 2006/0011145 A1 * | 1/2006 | Kates | A01K 15/02 119/719 |
| 2007/0222624 A1 * | 9/2007 | Eicken | A01K 15/021 340/573.3 |
| 2011/0187537 A1 * | 8/2011 | Touchton | G08B 23/00 340/573.3 |

* cited by examiner

*Primary Examiner* — Mark S Rushing
(74) *Attorney, Agent, or Firm* — UCLA Patent Law Clinic

(57) ABSTRACT

A variable power source attachment for providing and disconnecting power to a correctional animal collar is provided. In one embodiment, the variable power source attachment includes a first positive terminal and a first negative terminal coupled to the correctional collar; and a second positive terminal and a second negative terminal coupled to a power source. A relay is disposed between the first terminals and the second terminals and defines a closed position completing an electrical circuit and an open position disrupting the electrical circuit. A processing module includes a communication module with a receiver configured to receive at least one signal indicating that a smoke alarm has been activated; and a processor to switch the relay from the closed position to the open position, upon receipt of the at least one signal.

20 Claims, 10 Drawing Sheets

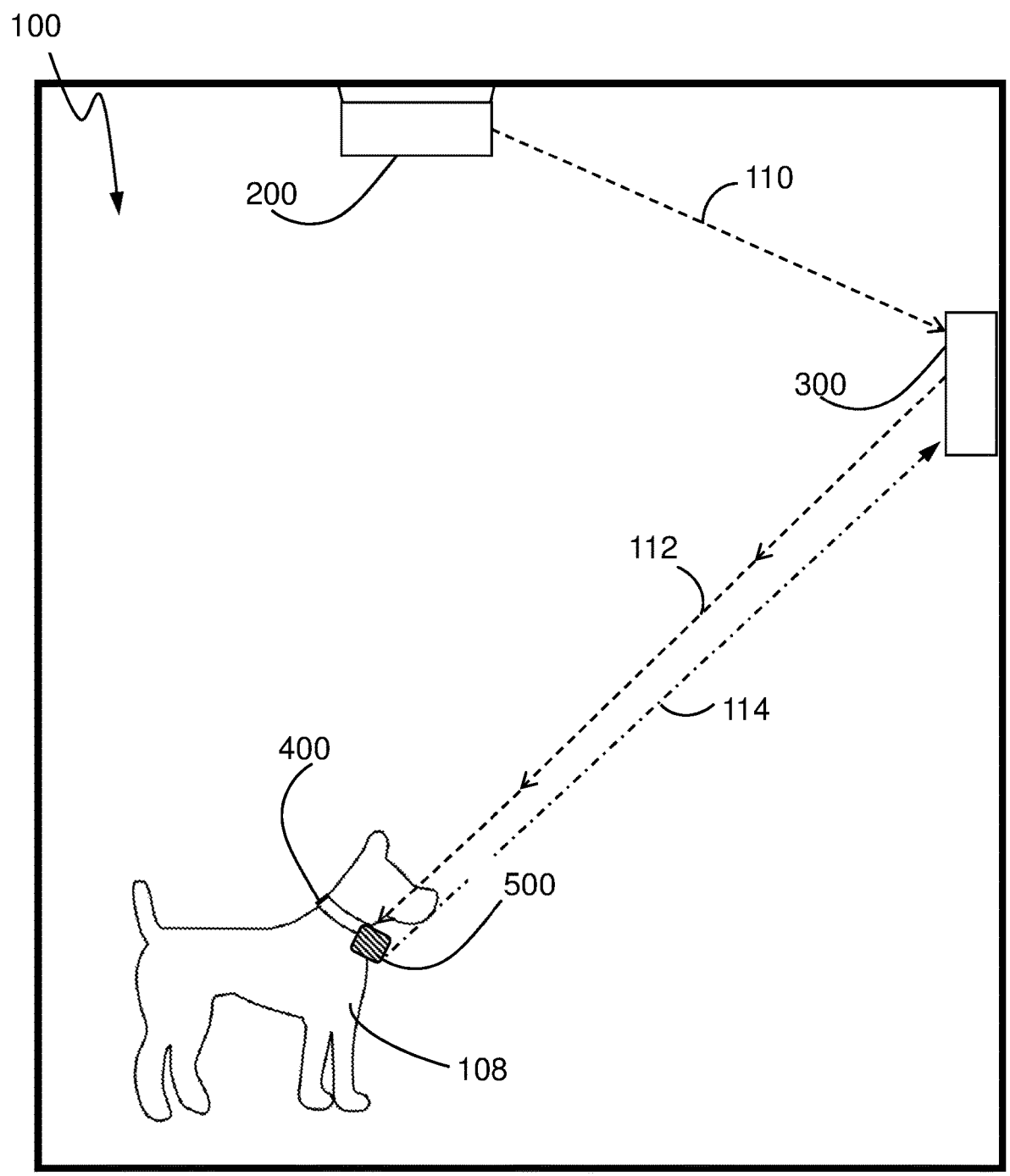
-- FIG. 1 --

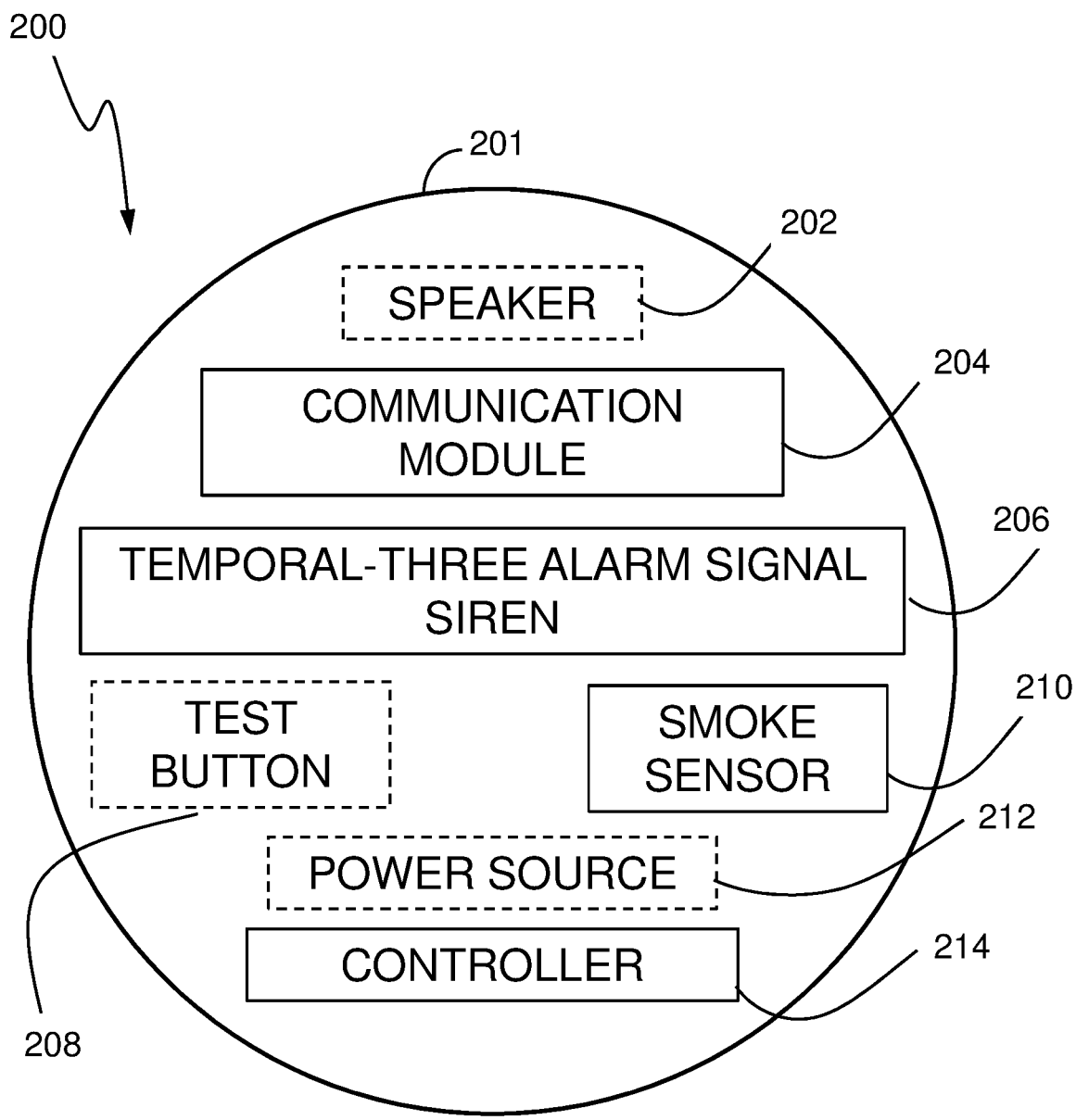
-- FIG. 2 --

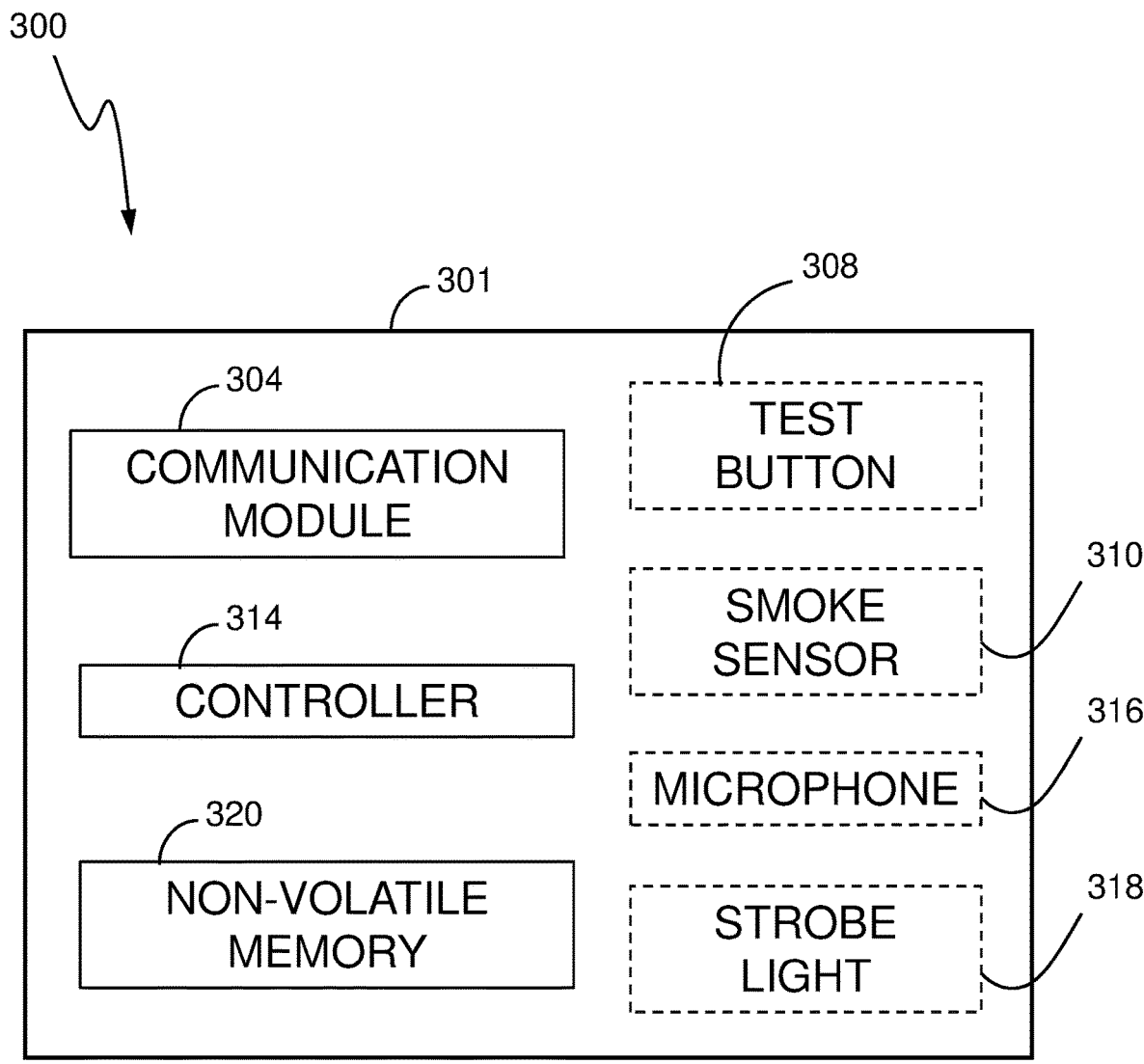
-- FIG. 3 --

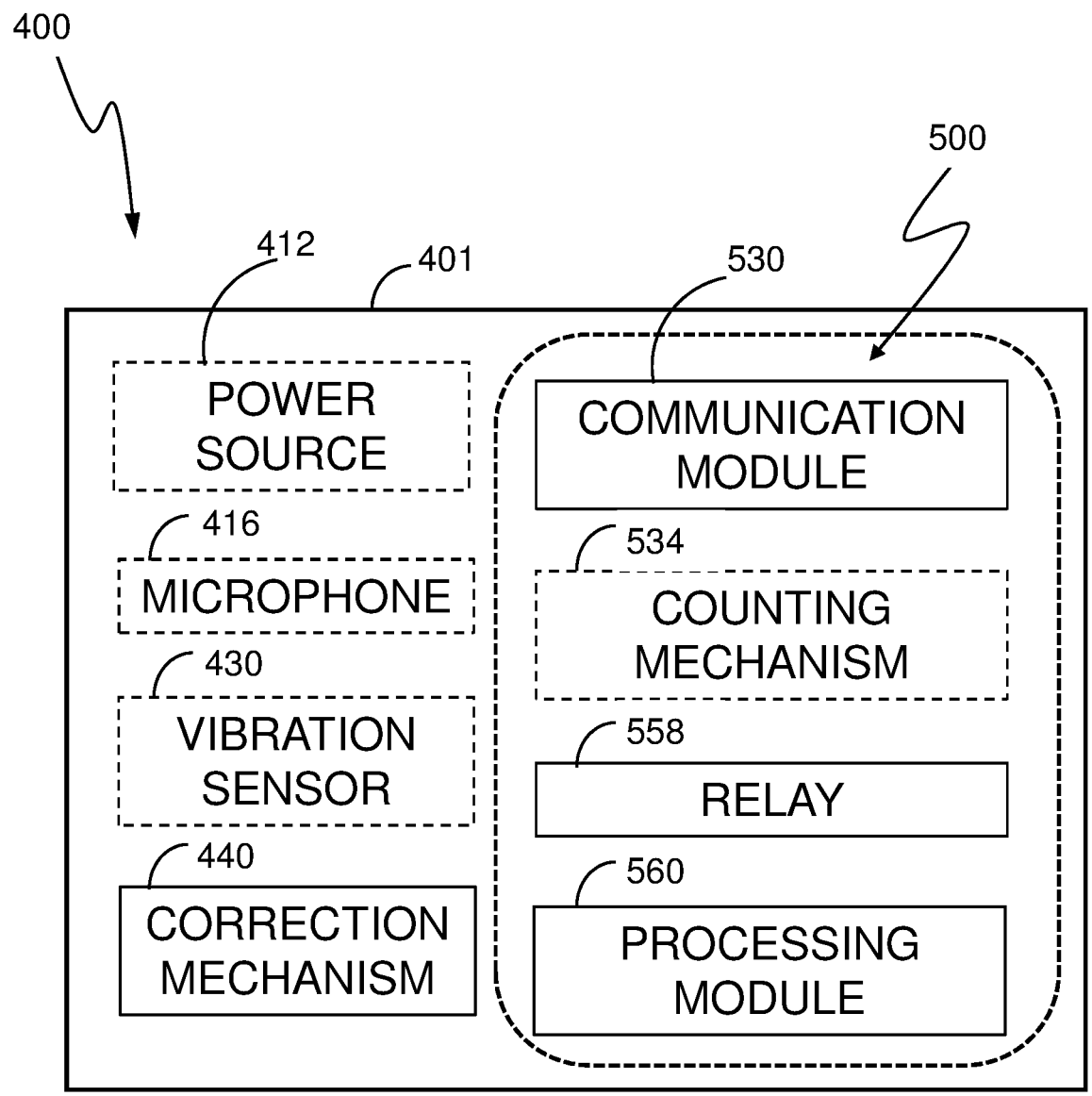
-- FIG. 4 --

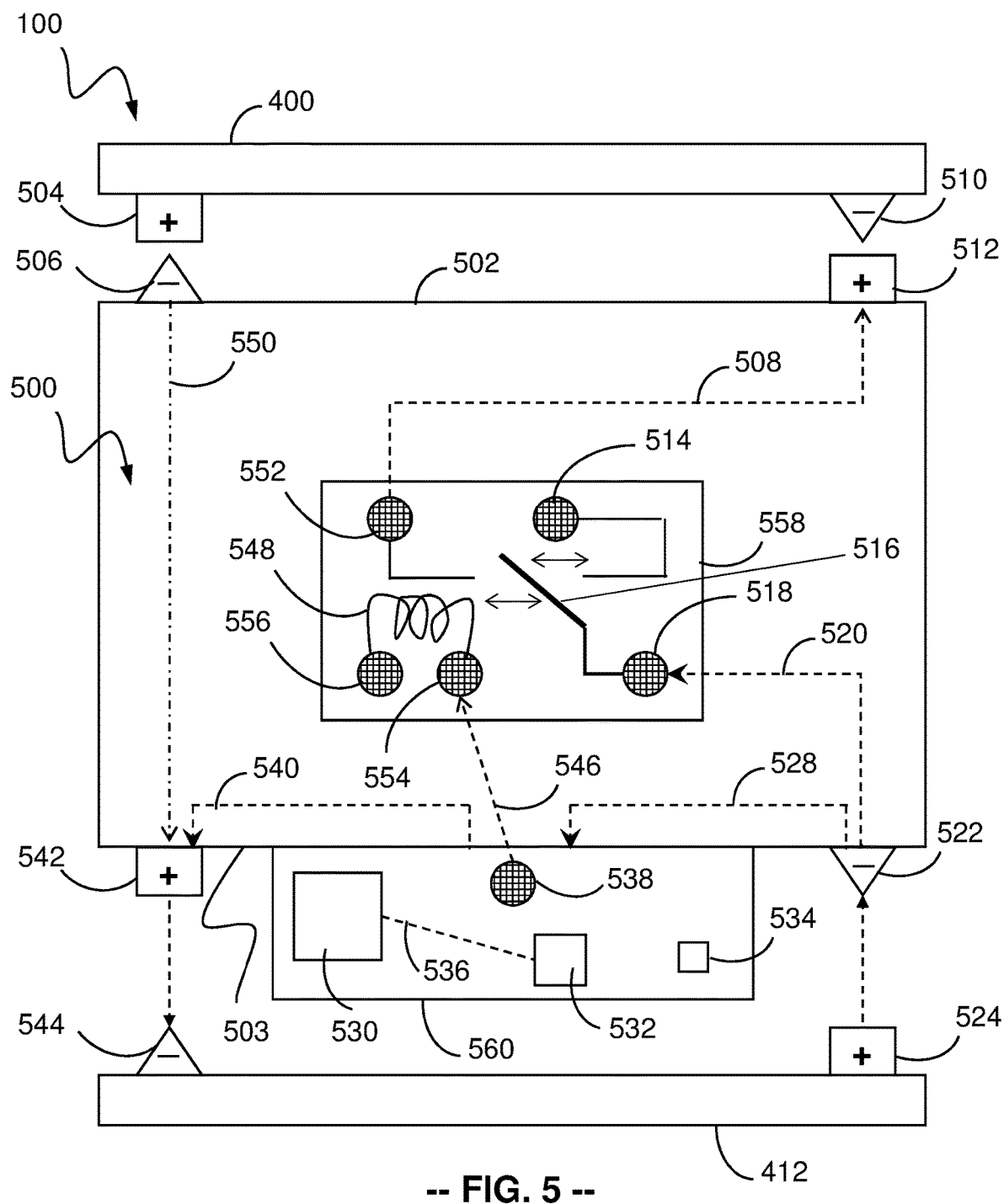
-- FIG. 5 --

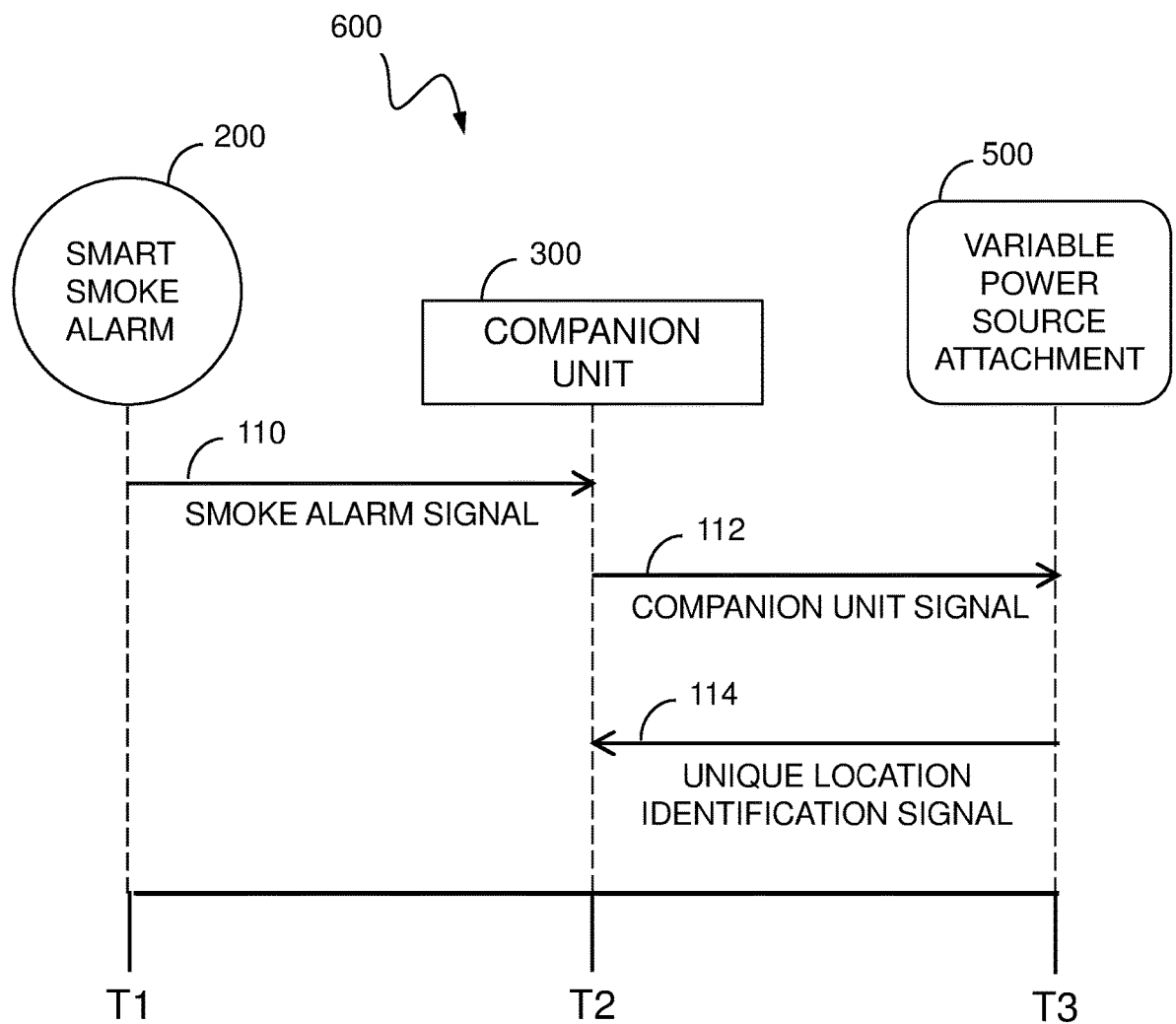
-- FIG. 6 --

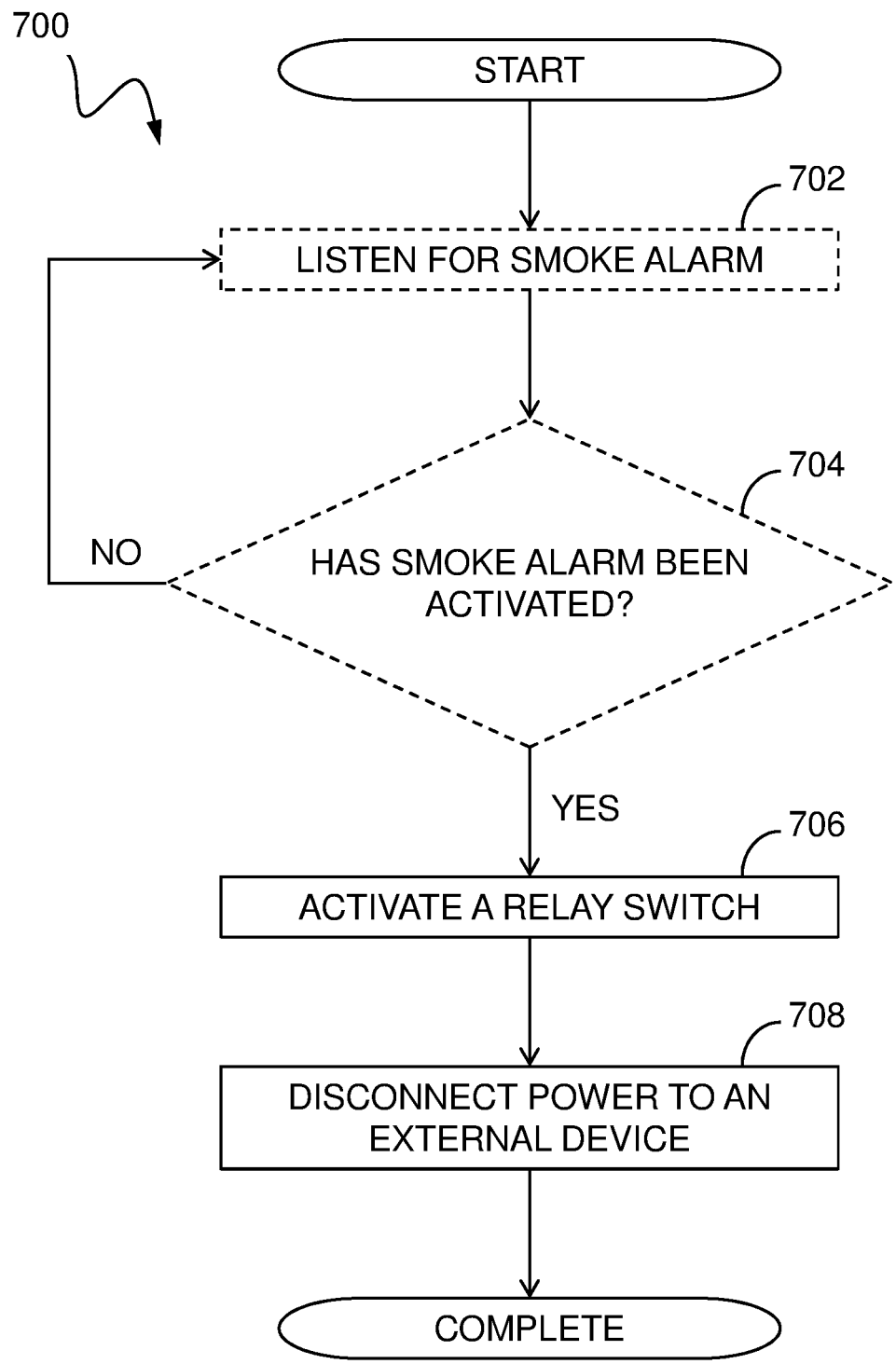
-- FIG. 7A --

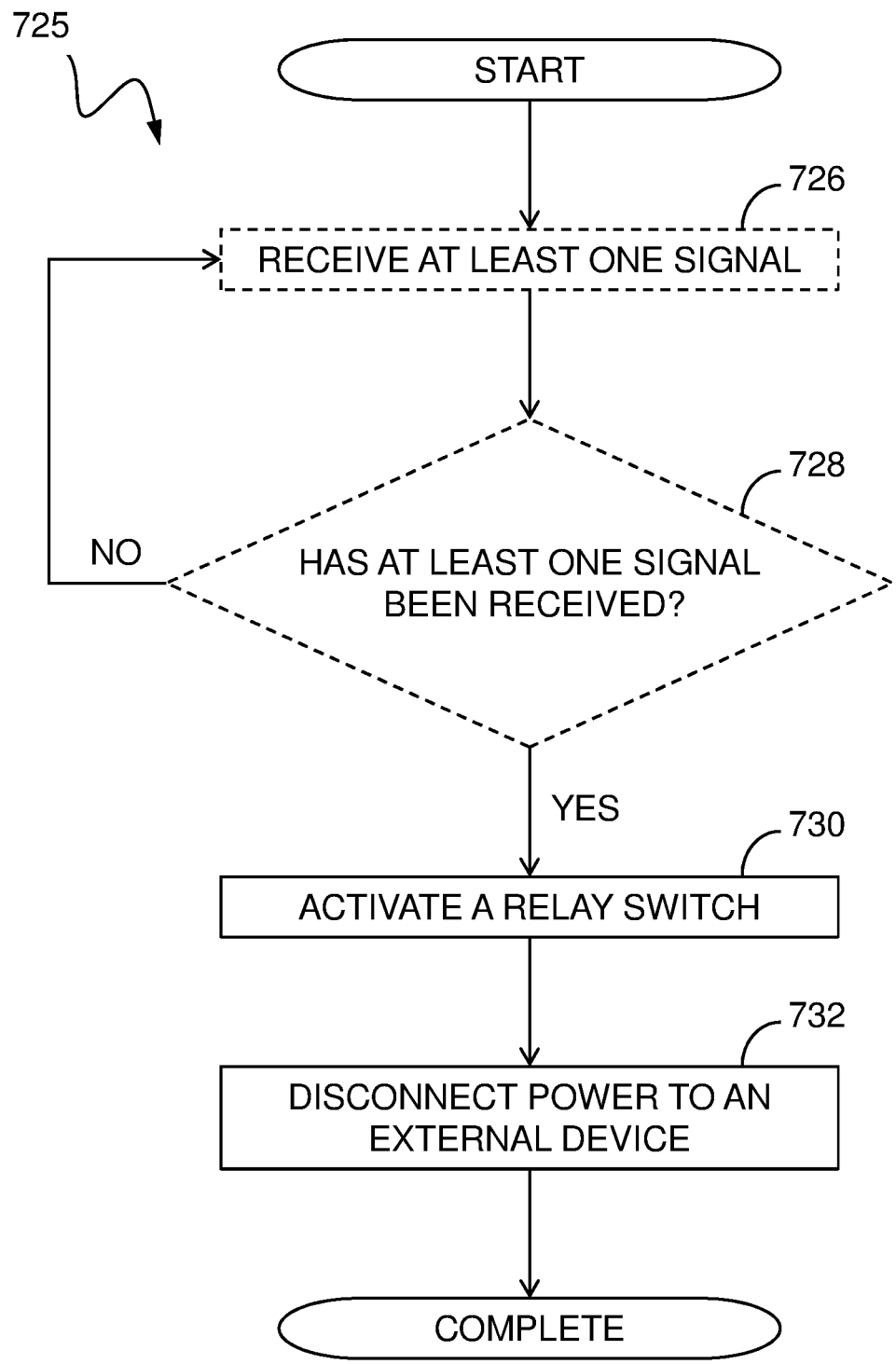
-- FIG. 7B --

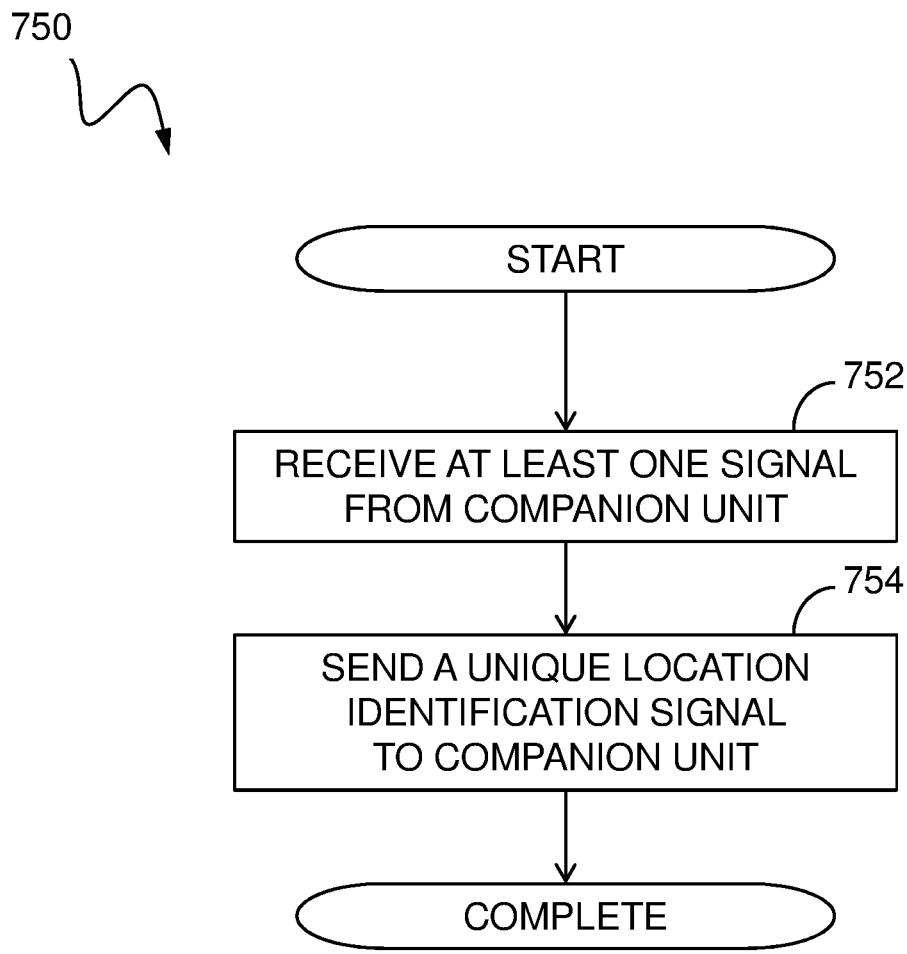
-- FIG. 7C --

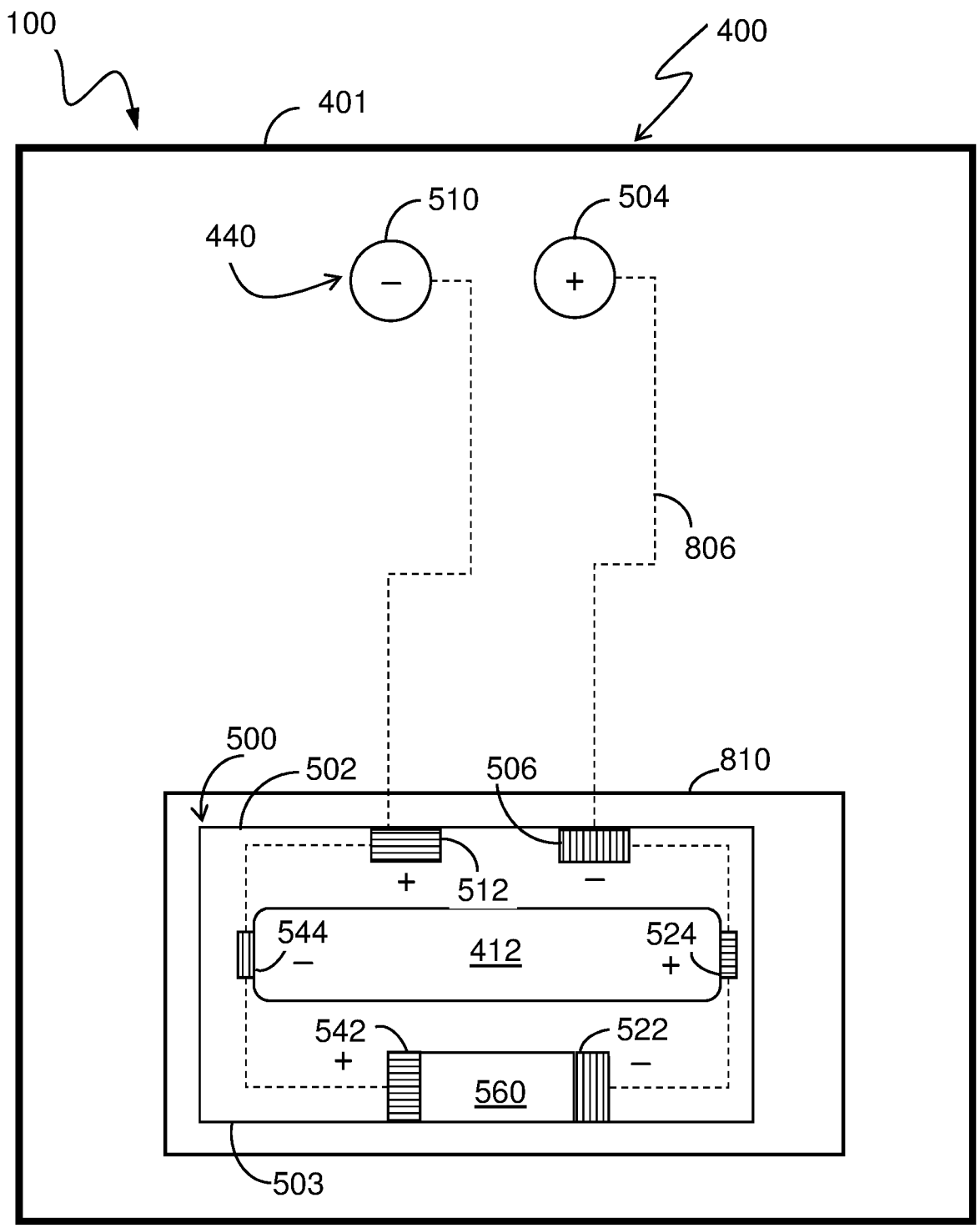
-- FIG. 8 --

VARIABLE POWER SOURCE ATTACHMENT FOR CORRECTIONAL ANIMAL COLLAR

TECHNICAL FIELD

The present disclosure generally relates to power sources and, more specifically, to variable power sources capable of controlling power flow to an external device (such as a correctional animal collar) during particular events.

BACKGROUND

A power source may be a device capable of storing and releasing electrical energy. A power source may take the form of a battery in which the battery provides power through external connections in order to power external devices. Batteries exist in many variations with differing sizes, shapes, and outputs. Some common voltage outputs used in batteries designed for consumer goods are 6-volt and 9-volt batteries.

A variable power source is a device that is capable of altering the power flow from an initial power source. Variable power sources are often used when a power source has certain output specifications, such as voltage or current, and an external device requires different input specifications. A variable power source can effectively change the output specifications of the power source so that the power source is compatible with an external device.

Variable power sources have many potential applications where power to a device may need to be disconnected. Animal correctional collars are devices that deliver correctional stimuli to an animal in order to prevent an animal from behaving in a particular manner. Correctional collars use negative reinforcement to train animal behavior. The correctional stimuli can be one of various types, including, but not limited to, electric shocks, sound, vibration, or chemical spray, which is delivered by means of a correction mechanism. Often, the collars are designed to prevent an animal from making noise, accessing certain areas, or engaging in otherwise undesirable behaviors. Correctional collars can either self-detect a behavior using a microphone or vibration sensors, be manually activated using a remote handset operated by a person, or receive instructions by another device such as a perimeter boundary unit. Currently, correctional collars can include integration with GPS and/or Internet mapping capabilities for the purpose of locating an animal's position.

The use of correctional collars, especially shock collars that employ electricity to deter behavior, can pose serious problems under certain conditions. In the event the correctional collar is designed to deliver a shock to a dog for making noise, such as barking, an issue arises in scenarios where it may be beneficial for the dog to bark or in instances where the dog becomes unresponsive to the shocks. Regarding the former, an emergency situation, such as a fire, may cause the dog to bark continuously in reaction to the fire alarm siren. Barking in this scenario has potential positive benefits, such as alerting individuals who may be unaware of the fire, allowing individuals to locate the dog if trapped, and preventing the stimulated dog from being inundated with shocks.

SUMMARY

A variable power source attachment for a correctional animal collar, in accordance with various embodiments of the present disclosure, is provided herein. According to a first aspect, a variable power source attachment for providing power to a correctional collar for an animal includes a first pair of electrical terminals coupled to an oppositely disposed first pair of electrical contacts of the correctional collar, the first pair of electrical terminals having a positive terminal and a negative terminal; a second pair of electrical terminals coupled to an oppositely disposed second pair of electrical contacts of a power source, the second pair of electrical terminals having a positive terminal and a negative terminal, such that a coupling of the first electrical terminals and the second electrical terminals to the respective first electrical contacts and the second electrical contacts completes an electrical circuits; a relay disposed between the first pair of electrical terminals and the second pair of electrical terminals, the relay defining a closed position completing the electrical circuit and an open position disrupting the electrical circuit and thereby terminating power flow to the correctional collar; a processing module comprising: a communication module with a receiver configured to receive at least one signal indicating that a smoke alarm has been activated; and a processor configured to switch the relay from the closed position to the open position, upon receipt of the at least one signal.

In a further embodiment, the correctional collar includes a correction mechanism to deliver a correction stimulus.

In another embodiment, the correction stimulus is at least one of an electric correction stimulus, a vibration correction stimulus, a sound correction stimulus, and a chemical spray correction stimulus.

In a still further embodiment, the variable power source attachment includes a magnetic coil configured to generate a magnetic field, and the relay is an electromagnetic relay configured to move between the closed position and the open position responsive to the magnetic field.

In still another embodiment, the relay switch is a MOSFET.

In a yet further embodiment, the communication module further includes a transmitter for transmitting a unique location identification signal used to determine the location of the correctional collar, using signal proximity.

In a further embodiment again, the correctional collar includes a microphone, and the at least one signal indicating that the smoke alarm has been activated is a Temporal-Three Smoke alarm signal detected by the microphone.

In a yet further embodiment, the at least one signal indicating that the smoke alarm has been activated is a companion unit signal.

In a further embodiment again, the power source is a 6-volt power source or a 9-volt power source.

In another embodiment again, the power source is disposed in the correctional collar.

In another additional embodiment, the variable power source attachment draws power from the power source.

According to another aspect of the present disclosure, a method for disconnecting power to a correctional collar for an animal uses a variable power source attachment coupled to the correctional collar. The method includes receiving at least one signal indicating that a smoke alarm has been activated using a receiver of a communication module of the variable power source attachment, where the variable power source attachment includes a first pair of electrical terminals coupled to an oppositely disposed first pair of electrical contacts of the correctional collar, the first pair of electrical terminals having a positive terminal and a negative terminal; a second pair of electrical terminals coupled to an oppositely disposed second pair of electrical contacts of a power source, the second pair of electrical terminals having a positive terminal and a negative terminal, such that a coupling of the first electrical terminals and the second electrical terminals to the respective first pair of electrical contacts and second pair of electrical contacts completes an electrical circuit; a processing module comprising the communication module; a relay positioned between the first pair of electrical terminals and the second pair of electrical terminals; and switching the relay from a closed position to an open position upon receiving the at least one signal indicating that the smoke alarm has been activated, thereby disconnecting the flow of current between the first pair of electrical terminals and the second pair of electrical terminals.

In a further embodiment, the correctional collar includes a correction mechanism to deliver a correction stimulus; and wherein the switching of the relay from the closed position to the open position disconnects the flow of current to the correction mechanism.

In a still further embodiment, the switching of the relay between the closed position and the open position is performed using a magnetic field generated by a magnetic coil of the variable power source attachment.

In still another embodiment, the relay switch is a MOSFET.

In still another embodiment, the method includes generating a Temporal-Three smoke alarm signal, via the smoke alarm; detecting the Temporal-Three Smoke alarm signal using a microphone of the correctional collar; and transmitting to the communication module the detected signal as the at least one signal indicating that the smoke alarm has been activated.

In a yet further embodiment, the method includes generating a companion unit signal using a companion unit to the smoke alarm, the companion unit signal being the at least one signal indicating that the smoke alarm has been activated.

In a further embodiment again, the power source is a 6-volt power source or a 9-volt power source.

In another embodiment again, the method includes providing the power source in the correctional collar.

In another additional embodiment, before receiving the at least one signal indicating that the smoke alarm has been activated, the method includes directing power from the power source to the variable power source attachment.

BRIEF DESCRIPTION OF THE DRAWINGS

FIG. 1 is a system diagram illustrating interactions between a smoke alarm, an optional companion unit to the smoke alarm, and a correctional collar with a variable power source attachment, in accordance with an embodiment of the present disclosure;

FIG. 2 is a schematic illustration of a smart smoke alarm, as may be used in conjunction with the system of FIG. 1, in accordance with an embodiment of the present disclosure;

FIG. 3 is a schematic illustration of the companion unit, as may be used with the smoke alarm of FIGS. 1 and 2, in accordance with an embodiment of the present disclosure;

FIG. 4 is a schematic illustration of the correctional collar comprising the variable power source attachment, as in FIG. 1, in accordance with an embodiment of the present disclosure;

FIG. 5 is a circuit diagram of the variable power source attachment of FIG. 4, in accordance with an embodiment of the present disclosure;

FIG. 6 is a timing diagram of the variable power source attachment system of FIGS. 4 and 5, in accordance with an embodiment of the present disclosure;

FIG. 7A is a flow chart illustrating a process for disconnecting power to an external device, in accordance with an embodiment of the present disclosure;

FIG. 7B is a flow chart illustrating a process for disconnecting power to an external device, in accordance with an embodiment of the present disclosure;

FIG. 7C is a flow chart illustrating a process for determining the location of the variable power source attachment (as in FIG. 4) connected to an external device (e.g., the correctional collar of FIG. 1), in accordance with an embodiment of the present disclosure; and FIG. 8 is a schematic illustration of the variable power source attachment configured in the correctional collar, in accordance with an embodiment of the present disclosure.

DETAILED DESCRIPTION

Turning now to the drawings, a variable power source attachment for providing variable power flow to an external device (e.g., a correctional pet collar) in accordance with various embodiments of the present disclosure is provided.

In many embodiments, the variable power source attachment may attach to a power source and bridge the connection between the power source and the external device, as further described below. In various embodiments, the power flow from the power source to the external device may be disconnected temporarily, as further described below. In several embodiments, the variable power source attachment may also be configured to draw power from the power source. In many embodiments, the variable power source attachment may include a relay with an open position in which power can flow from the power source to the external device and a closed position in which power flow from the power source to the external device is disconnected. In various embodiments, the variable power source attachment may include a communication module that is configured to receive a signal that prompts a processing module to disconnect power flow to the external device by means of the relay.

In various embodiments, the external device may be an animal correctional collar that is capable of delivering a correcting stimulus, such as (but not limited to) an electric shock, chemical spray, sound, and/or vibration. Systems for the variable power source attachment, in accordance with embodiments of the present disclosure, are discussed below.

Correctional Collar with Variable Power Source Attachment Systems

As shown in FIG. 1, a correctional collar 400 with a variable power source attachment 500 may be part of a system 100 (also shown in FIGS. 5 and 8) to selectively provide power to the correctional collar 400. In many embodiments, the system 100 may include a smart smoke alarm 200, (optionally) a companion unit 300, and the correctional collar 400 with the variable power source attachment 500. As further described below, the correctional collar 400 with the variable power source attachment 500 may be configured to prevent the correction mechanism from delivering a correction stimulus under particular circumstances.

A system diagram of the correctional collar with variable power source attachment system, in accordance with an embodiment of the present disclosure, is shown in FIG. 1. The system 100 may include the smart smoke alarm 200 that may transmit a smoke alarm signal 110 to the companion unit 300 when the smart smoke alarm 200 detects the presence of smoke, as further described below. In several embodiments, the companion unit 300 may be configured to send a companion unit signal 112 to the correctional collar 400 with the variable power source attachment 500 upon receiving the smoke alarm signal 110. In some embodiments, the correctional collar 400 with the variable power source attachment 500 is worn by an animal 108 and is configured to deliver a correction stimulus, as further described below. In addition, the correctional collar 400 may be configured to send a unique location identification signal 114 to the companion unit 300, as further described below.

In various embodiments, when the smart smoke alarm 200 detects the presence of smoke above a certain threshold, the smoke alarm signal 110 is transmitted. In several embodiments, the smoke alarm signal 110 may be received by the companion unit 104, which causes the companion unit 104 to transmit the companion unit signal 112 to the correctional collar 400.

In various embodiments, the companion unit signal 112 may be received by the correctional collar 400, causing a relay in the variable power source attachment 500 to disconnect, or disrupt, the power within the correctional collar 400, as further described below. The disconnection, or disruption, of the power within the correctional collar 400 deactivates the correctional stimulus.

The companion unit signal 112 may also activate the correctional collar 400 with variable power source attachment 500 to transmit a unique location identification signal 114 to the companion unit 300. Upon reception of the unique location identification signal 114, the companion unit 300 uses signal proximity to determine the location of the correctional collar 400 with variable power source attachment 500. The companion unit 300 may then relay the location of the correctional collar 400 with variable power source attachment 500 to an individual or another external device.

In many embodiments, the smoke alarm signal 110, the companion unit signal 112, and/or the unique location identification signal 114 may be transmitted using any wireless communication protocol, such as (but not limited to) (a) wireless local area networks (WLANs, such as Wi-Fi) and/or (b) wireless personal area networks (WPANs, such as wireless USB, BLUETOOTH®, X-BEE®, ZIGBEE®) and/or (c) cellular telephone communications (such as short message service (SMS) and multimedia messaging service (MMS)) and/or (d) any other wireless protocol, such as IEEE 802.11 or its subsequent versions. In another embodiment, the smoke alarm signal 110 may be a standard audible Temporal-Three (T-3) alarm signal.

Although specific systems for preventing a correctional collar with variable power source attachment from delivering a correction mechanism under particular conditions are discussed above with respect to FIG. 1, other systems including a correctional collar with a variable power source attachment can be utilized in accordance with embodiments of the present disclosure. For example, the system 100 may communicate directly with the correctional collar 400 without an intermediate companion unit 300, in which embodiment the smoke alarm signal 110 is received directly by the correctional collar 400, and the correctional collar 400 may transmit the unique location identification signal 114 directly to the smoke alarm 200. Smart smoke alarms 200 capable of detecting smoke and transmitting a smoke alarm signal 110, in accordance with embodiments of the present disclosure, are discussed below.

Smart Smoke Alarm

In many embodiments, the smart smoke alarm 200 may detect smoke and subsequently transmit the smoke alarm signal 110. The smart smoke alarm, in accordance with an embodiment of the present disclosure, is shown in more detail in FIG. 2. The smart smoke alarm 200 may include a housing 201 that contains the components. The smoke alarm 200 may include a smoke sensor 210 for detecting the presence of smoke. In many embodiments, the smart smoke alarm 200 may also include a Temporal-Three (T-3) smoke alarm signal siren 206 and may further include a speaker 202 for emitting a warning siren regarding the presence of smoke. In some embodiments, the smart smoke alarm 200 may include a power source 212. Further, the smart smoke alarm 200 may also include a communication module 204 comprising a transmitter and/or receiver. In addition, the smart smoke alarm 200 may include a controller 214 that causes the communication module 204 to transmit a smoke alarm signal 110, upon the detection of the presence of smoke by the smoke sensor 210.

Although the communication module 204 may house a transmitter and a receiver as separate components of the smart smoke alarm 200, a single component (such as a transceiver) may be capable of functioning as both the receiver and the transmitter of the communication module 204. In one exemplary configuration, the transceiver within the communication module 204 is a BLUETOOTH® transceiver, such as a BLUETOOTH® low-energy beacon, examples of which are an HC-05 wireless radio frequency transceiver and an HM-10 iBeacon® chip. With these low-energy beacons, the transceiver within the communication module 204 uses little operating power and operates in frequencies between 2400 and 2483.4 MHz (including a guard band of 2 MHz at the lower end of the frequency range and 3.5 MHz at the upper end of the frequency range). In one version, the transceiver within the communication module 204 uses a radio (broadcast) communications system, so that a visual line of sight between the transceiver within the communication module 204 and the receiving device is not required, provided a quasi-optical wireless path is available.

In several embodiments, the smart smoke alarm 200, upon the detection of smoke using the smoke sensor 210, may be configured to emit a Temporal-Three alarm signal via the Temporal-Three smoke alarm signal siren 206 and to transmit a smoke alarm signal 110 to an external device using a transmitter housed within the communication module 204. In some embodiments, the external device is the smart companion unit 300. In other embodiments, the external device is the correctional collar 400.

Although specific devices for detecting the presence of smoke and subsequently transmitting a smoke alarm signal 110 to an external device are discussed above with respect to FIG. 2, any of a variety of devices for detecting the presence of smoke and subsequently transmitting a smoke alarm signal to an external device (as appropriate to the requirements of a specific application) can be utilized in accordance with embodiments of the present disclosure. Companion units 300 capable of receiving the smoke alarm signal 110 and transmitting the companion unit signal 112, in accordance with embodiments of the present disclosure, are discussed below.

Companion Units

In many embodiments, the companion unit 300 detects the smoke alarm signal 110 (an audible T-3 signal and/or a wireless signal) and transmits a companion unit signal 112. The companion unit 300, in accordance with an embodiment of the present disclosure, is shown in FIG. 3. The companion unit 300 may include a housing 301 that contains the respective components of the companion unit 300. The companion unit 300 includes a communication module 304 that houses a receiver and a transmitter. In many embodiments, the companion unit 300 may also include a controller 314 that causes the communication module 304 to transmit the companion unit signal 112. The companion unit 300 may also include non-volatile memory 320.

In various embodiments, the companion unit 300 may also include a test button 308 to test the functionality of the companion unit 300, a microphone 316 for detecting particular sound patterns (such as the T-3 signal 110 from the smoke alarm 200, a strobe light 318 for notifying individuals of particular conditions, and/or a smoke sensor 310 for detecting the presence of smoke above a certain threshold level.

Although the communication module 304 may house a transmitter and a receiver as separate components of the companion unit 300, a single component (such as a transceiver) may be capable of functioning as both the receiver and the transmitter of the communication module 304. In one exemplary configuration, the transceiver within the communication module 304 is a BLUETOOTH® transceiver, such as a BLUETOOTH® low-energy beacon, examples of which are an HC-05 wireless radio frequency transceiver and an HM-10 iBeacon® chip. With these low-energy beacons, the transceiver within the communication module 304 uses little operating power and operates in frequencies between 2400 and 2483.4 MHz (including a guard band of 2 MHz at the lower end of the frequency range and 3.5 MHz at the upper end of the frequency range). In one version, the transceiver within the communication module 304 uses a radio (broadcast) communications system, so that a visual line of sight between the transceiver within the communication module 304 and the receiving device is not required, provided a quasi-optical wireless path is available.

In many embodiments, the communication module 304 of the companion unit 300 may be configured to receive a signal (e.g., signal 110 or signal 114) from an external device. Such an external device may be the smart smoke alarm 200 that transmits a signal 110 to the companion unit 300 or a traditional smoke alarm that emits an audible Temporal-Three alarm signal siren capable of being detected by the microphone 316 housed within the companion unit 300. Upon reception of the signal (e.g., the signal 110) by the receiver within the communication module 304, the controller 314 may cause the communication module 304 to transmit the companion unit signal 112 to an external device. In many embodiments, the external device may be the correctional collar 400.

Alternatively, in some embodiments of the companion unit 300, the smoke sensor 310 may detect the presence of smoke above a certain threshold level, which may cause the controller 314 to configure the communication module 304 to transmit the signal 112 to an external device. In many embodiments, the external device may be the correctional collar 400.

Although specific devices for detecting a smoke alarm signal 110 and subsequently transmitting a companion unit signal 112 to an external device are discussed above with respect to FIG. 3, any of a variety of devices for detecting a smoke alarm signal and subsequently transmitting a companion unit signal 112 to an external device (as appropriate to the requirements of a specific application) can be utilized in accordance with embodiments of the present disclosure. The correctional collar 400 with the variable power source attachment 500, which is capable of receiving the smoke alarm signal 110 or a companion unit signal 112 and of disconnecting power flow to a correction mechanism, in accordance with embodiments of the present disclosure, are discussed below.

Correctional Collar

In many embodiments, the correctional collar 400 receives the signal 110 or 112 from an external device (e.g., the smoke alarm 200 or the companion unit 300) and disconnects power flow to a correction mechanism 440. The correctional collar 400, in accordance with an embodiment of the present disclosure, is shown in more detail in FIG. 4. The correctional collar 400 includes a housing 401 that contains the components of the collar 400, including the correction mechanism 440 that is capable of delivering a correctional stimulus to the wearer (e.g., the pet 108) of the correctional collar 400.

In various embodiments, the correctional collar 400 may also include the variable power source attachment 500 that attaches to a power source 412 and is capable of disconnecting power flow to the correction mechanism 440, as further described below. In many embodiments, the variable power source attachment 500 may house a relay 558 that has an open position and a closed position, as further described below. In several embodiments, the variable power source attachment 500 may include a processing module 560 that contains a processor 532 (shown in FIG. 5) and a correctional collar application, as further described below. In many embodiments, the variable power source attachment 500 may also include a counting mechanism 534 that keeps track of time, as further described below. In various embodiments, the variable power source attachment 500 may include a communication module 530 that houses a receiver and/or a transmitter, as further described below.

Although the communication module 530 may house a transmitter and a receiver as separate components of the correctional collar 400, a single component (such as a transceiver) may be capable of functioning as both the receiver and the transmitter of the communication module 530. In one exemplary configuration, the transceiver within the communication module 530 is a BLUETOOTH® transceiver, such as a BLUETOOTH® low-energy beacon, examples of which are an HC-05 wireless radio frequency transceiver and an HM-10 iBeacon® chip. With these low-energy beacons, the transceiver within the communication module 530 uses little operating power and operates in frequencies between 2400 and 2483.4 MHz (including a guard band of 2 MHz at the lower end of the frequency range and 3.5 MHz at the upper end of the frequency range). In one version, the transceiver within the communication module 530 uses a radio (broadcast) communications system, so that a visual line of sight between the transceiver within the communication module 530 and the receiving device is not required, provided a quasi-optical wireless path is available.

The correctional collar 400 may also include a microphone 416 for detecting particular sound patterns or a vibration sensor 430 for detecting vibrations, such as sound made by the wearer 108 of the correctional collar 400, as further described below.

In several embodiments, the correctional collar 400 may be configured to receive a signal (e.g., signal 110 or signal 112) from an external device (such as the smoke alarm 200 or the companion unit 300, respectively). Such an external device may be the companion unit 300, as discussed above, which transmits the signal 112 to the correctional collar 400, a smart smoke alarm 200 that transmits the signal 110 to the correctional collar 400, or a traditional smoke alarm that emits a Temporal-Three alarm signal siren capable of being detected by the microphone 416 housed within the correctional collar 400. In many embodiments, upon reception of a signal by the receiver within the communication module 530, the processing module 560 may configure the relay 558 housed within the variable power source attachment 500 to move from a closed position to an open position, thereby disrupting power flow from the power source 412 to the correction mechanism 440, as further described below. In some embodiments, the counting mechanism 534 may, after a programmed period of time, direct the processing module 560 to move the relay 558 back to a closed position, thereby permitting power flow from the power source 412 to the correction mechanism 440, as further described below.

Absent the signal 110, 112 from the smoke alarm 200 or an external device (such as the companion unit 300), the correctional collar 400 may be configured to deliver a correctional stimulus by means of the correction mechanism 440, in the event the wearer 108 engages in undesirable activity. In some embodiments, the correctional collar 400 may use the vibration sensor 430 to self-detect that the wearer 108 has made noise (such as barking). In some embodiments, the correctional collar 400 may also use the microphone 416 to self-detect that the wearer 108 has made noise. In some embodiments, when noise is detected, the correctional collar 400 may then deliver a correctional stimulus by means of the correction mechanism 440.

In several embodiments, the communication module 530 may include a transmitter (or transceiver) used to transmit signals to external devices (e.g., the smoke alarm 200 or the companion unit 300). In many embodiments, the transmitter (or transceiver) in the communication module 430 may transmit the unique location identification signal 114 for the purpose of determining the location of the correctional collar 400. The unique location identification signal 114 may be transmitted using any of the following communication protocol standards: (a) wireless local area networks (WLANs, such as Wi-Fi) and/or (b) wireless personal area networks (WPANs, such as wireless USB, BLUETOOTH®, X-BEE®, ZIGBEE®) and/or (c) cellular telephone communications (such as short message service (SMS) and multimedia messaging service (MMS)) and/or (d) any other wireless protocol, such as IEEE 802.11 or its subsequent versions. In some embodiments, the unique location identification signal 114 may be transmitted to the smoke alarm 200, the companion unit 300, or an individual's mobile device (such as a cellular telephone).

In many embodiments, the counting mechanism 534 may include any method of keeping or telling time, including, but not limited to, a real-time clock (RTC), a hardware clock, a clock generator, a timer chip, a timing integrated circuit, a timer, or a third-party counter identifier, such as may be accessible via an internet connection. In one version contemplated herein, the counting mechanism 534 is a hardware clock. In another version, the counting mechanism 534 may also use a RTC to track the date and time. While reference may be made herein to the counting mechanism 534 counting down a prescribed period, it should be recognized that the counting mechanism 534 may instead measure time to a prescribed point in time (such as a particular hour), based on settings of a real-time clock or other mechanism.

In many embodiments, the variable power source attachment 500 attaches to a power source 412, such as a 6-volt or 9-volt battery, and may be configured to draw power from the power source 412. In many embodiments, the variable power source attachment 500 may then bridge the terminals that would otherwise connect to the correctional collar 400, as further discussed below. In this configuration, the variable power source attachment 500 may act as a gatekeeper of power flow from the power source 412 to the correction mechanism 440.

In many embodiments, the relay 558 may reside within the variable power source attachment 500. In various embodiments, the relay 558 maintains a closed position that allows power to flow from the power source 412 to the correction mechanism 440. In several embodiments, when the communication module 530 receives a signal (e.g., the signal 114), the processing module 560 may direct the relay 558 to an open position, which disconnects power flow from the power source 412 to the correction mechanism 440. In this deactivated configuration, the wearer 108 of the correctional collar 400 may engage in any behavior without the threat of a correctional stimulus delivered by means of the correction mechanism 440. The relay 558 may be any type of electromagnetic relay including (but not limited to) field-effect transistors, such as MOSFET, JFET, MNOS, DGMOSFET, DEPFET, FREDFET, or MESFET.

In many embodiments, the correction mechanism 440 delivers a correctional stimulus in the form of an electric shock, sound, vibration, chemical spray, or other unfavorable means.

In many embodiments, the processing module 560 contains the processor 532 and a correctional collar application that may be initiated by the reception of the signal 112 or 114. When the correctional collar application is initiated within the processor 532, the relay 558 may move from a closed position to an open position, as further discussed below.

Reference herein to the "correctional collar" should be understood to include those collars in which the correction mechanism 440 is integrated within the collar (e.g., within the strap or banding of the correctional collar 400), as well as those collars in which the correction mechanism 440 is separable from the collar strap or banding (e.g., a correction mechanism 440 that is hung from the strap or banding or through which the strap or banding is positioned). Regardless of the type of correctional collar used, the present variable power source attachment 500 may be employed to disconnect power flow to the correction mechanism 440 in certain emergency situations. Advantageously, the variable power source attachment 500 is compatible with various types of correctional collars and may be retro-fit into existing correctional collars.

Although specific devices for disconnecting power flow to a correction mechanism using a variable power source attachment 500 are discussed above with respect to FIG. 4, any of a variety of devices for disconnecting power flow to a correction mechanism 440 using a variable power source attachment 500 (as appropriate to the requirements of a specific application) can be utilized in accordance with embodiments of the present disclosure.

Variable Power Source Attachment

In many embodiments, the variable power source attachment 500 interrupts or disrupts the power flow from the power source 412 to the correction mechanism 440. The variable power source attachment 500, in accordance with an embodiment of the present disclosure, is shown in more detail in FIG. 5.

The variable power source attachment 500 may reside between the power source 412 and the external device 400. In many embodiments, the variable power source attachment 500 may have a first side 502 and a second side 503. In various embodiments, a negative terminal 506 of the first side 502 may connect to a positive terminal 504 of the external device 400. In many embodiments, a positive terminal 512 of the first side 502 may connect to a negative terminal 510 of the external device 400.

In various embodiments, a negative terminal 522 of the second side 503 may connect to a positive terminal 514 of the power source 412. In many embodiments, a positive terminal 542 of the second side 503 may connect to a negative terminal 544 of the power source 412.

In several embodiments, a relay 558 may exist between the negative terminal 522 of the second side 503 and the positive terminal 512 of the first side 502. In other embodiments, the relay 558 may have an open position and a closed position. In various embodiments, in the closed position, power may flow freely from the negative terminal 522 of the second side 503 to the positive terminal 512 of the first side 502. In several embodiments, the closed position allows the power source 412 to provide power to the external device 400.

In many embodiments, the external device may be the animal correctional collar 400, as described herein.

In many embodiments, a power flow 520 from the negative terminal 522 of the second side 503 may connect to a first relay pin 518 of the relay 558. In some embodiments, power may flow from the first relay pin 518, through a relay switch 516, and, assuming a closed position of the relay switch 516, to a second relay pin 552. In many embodiments, power may flow from the second relay pin 552 to the positive terminal 512 of the first side 502, via a dependent power flow 508 from the second relay pin 552 to the positive terminal 512 of the first side 502.

In various embodiments, power may flow from the positive terminal 512 of the first side 502 to the negative terminal 510 of the external device 400. In yet further embodiments, power may flow from the positive terminal 504 of the external device 400 to the negative terminal 506 of the first side 502 to begin the completion of the circuit. In many embodiments, power may flow through a ground power flow 550 through the variable power source attachment 500 before moving into the positive terminal 542 of the second side 503, and finally into the negative terminal 544 of the power source 412.

In various embodiments, the first relay pin 518 of the relay 558 may receive power from a power flow 520 from the negative terminal 522 of the second side 503. In many embodiments, the relay 558 may contain the relay switch 516 that is capable of moving between an open position and a closed position. In some embodiments, while in a closed position, the relay switch 516 may make a connection with circuitry connected to the second relay pin 552, which then may connect to the positive terminal 512 of the first side 502, as discussed above.

In some embodiments, while in an open position, the relay switch 516 may make a connection with circuitry connected to a third relay pin 514, which may not connect to any other structure, thereby causing the power flow to stop at the third relay pin 514. In various embodiments, the relay 558 may further include a fourth relay pin 554 and a fifth relay pin 556 that may be connected to one another by a magnetic coil 548. In some embodiments, the magnetic coil 548 may be capable of generating a magnetic field that moves the relay switch 516 between a closed position and an open position. The relay 558 may be any type of electromagnetic relay, including (but not limited to) field-effect transistors, such as MOSFET, JFET, MNOS, DGMOSFET, DEPFET, FREDFET, or MESFET, and, in some instances, the absence (rather than the generation) of the magnetic field may move the relay switch 516 or otherwise disrupt the circuit.

In many embodiments, the variable power source attachment 500 may contain a processing module 560. The processing module 560 is defined as the portion of the variable power source attachment 500 that may house the following components: the processor 532, the communication module 530, the counting mechanism 534, and a processor pin 538.

In several embodiments, the processing module 560 may draw power from the power source 412 by means of a first processor power flow 528 that may move from the positive terminal 524 of the power source 412, through the negative terminal 522 of the second side 503, to the processing module 560, and then by means of a second processor power flow 540 from the processing module 560 to the positive terminal 542 of the second side 503, which connects in turn to the negative terminal 544 of the power source 412.

In various embodiments, the variable power source attachment 500 may contain the power flow 528 from the negative terminal 522 of the second side 503 to the processing module 560 and the power flow 540 from the processing module 560 to the positive terminal 542 of the second side 503 in order to provide power to the processing module 560 and its components. The processing module 560 contains the communication module 530, which is connected to the processor 532 by means of communication module-to-processor circuitry 536. It should be understood that, in some embodiments, the flows 528, 540 may be reversed, such that the flow originates from the negative terminal 544 of the power source 412, flows through the processing module 560, and terminates in the positive terminal 524 of the power source 412.

Although the communication module 530 may house a transmitter and a receiver as separate components of the variable power source attachment 500, a single component (such as a transceiver) may be capable of functioning as both the receiver and the transmitter of the communication module 530. In one exemplary configuration, the transceiver within the communication module 530 is a BLUETOOTH® transceiver, such as a BLUETOOTH® low-energy beacon, examples of which are an HC-05 wireless radio frequency transceiver and an HM-10 iBeacon® chip. With these low-energy beacons, the transceiver within the communication module 530 uses little operating power and operates in frequencies between 2400 and 2483.4 MHz (including a guard band of 2 MHz at the lower end of the frequency range and 3.5 MHz at the upper end of the frequency range). In one version, the transceiver within the communication module 530 uses a radio (broadcast) communications system, so that a visual line of sight between the transceiver within the communication module 530 and the receiving device is not required, provided a quasi-optical wireless path is available.

In some embodiments, the processing module 560 may contain the counting mechanism 534. In various embodiments, the processing module 560 may include the processor pin 538. In many embodiments, when the communication module 530 receives a signal (e.g., a signal 110 or 112), the processor 532 may configure the processor pin 538 to engage a dependent power flow 546 from the processor pin 538 to the fourth relay pin 554, which may be housed in the relay 558.

In many embodiments, the variable power source attachment 500, in the absence of any received signals, may allow power to flow freely from the power source 412 to the external device 400. In several embodiments, the reception of a signal (e.g., signal 110 or signal 112) by the communication module 530 may configure the processor 532 to initiate a power source override application, which may configure the processor pin 538 to transmit the dependent power flow 546 from the processor pin 538 to the fourth relay pin 546. In several embodiments, the dependent power flow 546 from the processor pin 538 to the fourth relay pin 546 may cause current to move from the fourth relay pin 546, through the magnetic coil 548, and into the fifth relay pin 556. In many embodiments, this movement of current may cause the magnetic coil 548 to generate a magnetic field capable of moving the relay switch 516 from a closed position to an open position. In various embodiments, while in the open position, the dependent power flow 508 from the second relay pin 558 to the positive terminal 512 of the first side 502 is disconnected, and the external device 400 fails to receive power from the power source 412.

In many embodiments, the counting mechanism 534, after a programmed length of time, may prevent the processor 532 from configuring the processor pin 538 to engage the dependent power flow 546 from the processor pin 538 to the fourth relay pin 554, which may discontinue the magnetic field created by the magnetic coil 548 and which subsequently may allow the relay switch 516 to move back to a closed position. In the closed position, the relay switch 516 re-engages the dependent power flow 508 from the second relay pin 552 to the positive terminal 512 of the first side 502, and thus the external device 400 may receive power from the power source 412 after the programmed length of time.

In some embodiments, the communication module 530 may also contain a transmitter (or a transceiver) capable of transmitting the unique location identification signal 114 to an external device (e.g., the smoke alarm 200, the companion unit 300, or an individual's personal device, such as a cellular telephone) for the purpose of locating the wearer 108 of the correctional collar 400 in which the variable power source attachment 500 is housed.

In many embodiments, the processing module 532 may receive a signal from the communication module 530 by means of the communication module-to-processor circuitry 536. In various embodiments, upon reception of a signal, the processor 532 may initiate a power source override application, which may configure the processor pin 538 to transmit the dependent power flow 546 from the processor pin 538 to the fourth relay pin 546.

In many embodiments, the counting mechanism 534 may comprise any method of keeping or telling time, including, but not limited to, a real-time clock (RTC), a hardware clock, a clock generator, a timer chip, a timing integrated circuit, a timer, or a third-party counter identifier, such as may be accessible via an internet connection. In one version contemplated herein, the counting mechanism 534 is a hardware clock. In another version, the counting mechanism 534 may also use a RTC to track the date and time. While reference may be made herein to the counting mechanism 534 counting down a prescribed period, it should be recognized that the counting mechanism 534 may instead measure time to a prescribed point in time (such as a particular hour), based on settings of a real-time clock or other mechanism.

While FIG. 5 illustrates an exemplary embodiment in which the circuit originates at the positive terminal 514 of the power source 412 and which employs the power flow 520 from the second side 503 of the variable power source attachment 500 to the first pin 518, it should be understood that the circuit may be configured to operate in the opposite direction. In this instance (not separately illustrated), the power flow 520 from the second side 503 of the variable power source attachment 500 originates from the negative terminal 544 of the power source 412 and travels through the positive terminal 542 of the second side 503 to the first pin 518. Further, in this embodiment, the dependent power flow 508 from the second relay pin 552 is conveyed to the negative terminal 506 of the first side 502 (rather than to the positive terminal 512).

Although specific devices for disconnecting power flow to an external device 400 using a variable power source attachment 500 are discussed above with respect to FIG. 5, any of a variety of devices for disconnecting power flow to an external device 400 using a variable power source attachment 500 (as appropriate to the requirements of a specific application) can be utilized in accordance with embodiments of the present disclosure.

Signal Timing

In many embodiments, a series of sequential signals move between the smart smoke alarm 200, the companion unit 300, and the variable power source attachment 500. A timing diagram of the variable power source attachment system, in accordance with an embodiment of the present disclosure, is shown in FIG. 6. The smoke alarm 200 transmits the smoke alarm signal 110 to the companion unit 300. In many embodiments, upon reception of the smoke alarm signal 110, the companion unit 300 transmits the companion unit signal 112 to the variable power source attachment 500. In various embodiments, upon reception of the companion unit signal 112, the variable power source attachment 500 transmits the unique location identification signal 114 back to the companion unit 300.

The smoke alarm signal 110, the companion unit signal 112, and the unique location identification signal 114 may be transmitted using any of the following communication protocol standards: (a) wireless local area networks (WLANs, such as Wi-Fi) and/or (b) wireless personal area networks (WPANs, such as wireless USB, BLUETOOTH®, X-BEE®, ZIGBEE®) and/or (c) cellular telephone communications (such as short message service (SMS) and multimedia messaging service (MMS)) and/or (d) any other wireless protocol, such as IEEE 802.11 or its subsequent versions. In some embodiments, the unique location identification signal 114 may be transmitted to the companion unit 300 or an individual's mobile device, such as a cellular telephone, smart watch, or tablet computer.

In another embodiment, the smoke alarm signal 110 is transmitted directly to the variable power source attachment 500. In such systems without the companion unit 300, the variable power source attachment 500 transmits the unique location identification signal 114 to the smoke alarm 200 or other external devices.

In yet another embodiment, the smoke alarm signal 110 may be an audible Temporal-Three alarm signal that is transmitted to either the companion unit 300 or the variable power source attachment 500.

Although specific timings for transmitting a series of sequential signals are discussed above with respect to FIG. 6, any of a variety of timings for transmitting a series of sequential signals (as appropriate to the requirements of a specific application) can be utilized in accordance with embodiments of the present disclosure.

Power Disconnection Processes Utilizing a Relay

In many embodiments, as described herein, the relay 558 can be utilized to disconnect power to the external device 400. A flow chart illustrating a process for disconnecting power to the external device 400, in accordance with an embodiment of the present disclosure, is shown in FIG. 7A. In many embodiments, the process 700 includes an initial optional step (702), in which the device that houses the relay, in some embodiments the variable power source attachment 500, listens for the smoke alarm 200. If the smoke alarm 200 has not been activated (as determined in step 704), then the device 500 may continue to listen for the smoke alarm 200. If the smoke alarm 200 has been activated (as determined in step 704), then the device 500 (in step 706) may activate the relay switch 558. When the relay switch 558 is activated (per step 706), the device 500 may disconnect or disrupt power to the external device 400 (in step 708).

In many embodiments, the external device may be a correctional collar 400 with a correction mechanism 440. When the smoke alarm 200 has been activated (per step 704), the relay switch 558 may be activated (per step 706), and power to the correction mechanism may be disconnected so that correctional stimuli is not delivered to the wearer 108 of the correctional collar 400.

In another embodiment, the smoke alarm 200 may transmit a signal or series of signals that prompts the activation of the relay switch (per step 706). The signal or series of signals may be transmitted using any of the following communication protocol standards: (a) wireless local area networks (WLANs, such as Wi-Fi) and/or (b) wireless personal area networks (WPANs, such as wireless USB, BLUETOOTH®, X-BEE®, ZIGBEE®) and/or (c) cellular telephone communications (such as short message service (SMS) and multimedia messaging service (MMS)) and/or (d) any other wireless protocol, such as IEEE 802.11 or its subsequent versions.

In yet another embodiment, the smoke alarm 200 may emit an audible Temporal-Three alarm signal that prompts the activation of the relay switch (in step 706).

A flow chart illustrating a process for disconnecting power to an external device 400, in accordance with an embodiment of the present disclosure, is shown in FIG. 7B. The process 725 may include an initial optional step (726), in which the device that houses the relay, in some embodiments the variable power source attachment 500, listens for at least one signal. If at least one signal has not been received (as determined in step 728), then the device 500 may continue to listen for an at least one signal (per step 726). If at least one signal has been received (in step 728), then the device 500 (in step 730) may activate the relay switch 558. When the relay switch 558 is activated (in step 730), the device 500 may disconnect power to the external device 400 (in step 732).

In many embodiments, the external device may be the correctional collar 400 with the correction mechanism 440. When at least one signal has been received (as determined in step 728), the relay switch 558 may be activated (in step 730), and power to the correction mechanism 440 may be disconnected, so that correctional stimuli is not delivered to the wearer 108 of the correctional collar 400.

In another embodiment, at least one signal may be transmitted using any of the following communication protocol standards: (a) wireless local area networks (WLANs, such as Wi-Fi) and/or (b) wireless personal area networks (WPANs, such as wireless USB, BLUETOOTH®, X-BEE®, ZIGBEE®) and/or (c) cellular telephone communications (such as short message service (SMS) and multimedia messaging service (MMS)) and/or (d) any other wireless protocol, such as IEEE 802.11 or its subsequent versions.

In yet another embodiment, the companion unit 300 may transmit at least one signal (i.e., signal 112).

In a further embodiment, the smart smoke alarm 200 may transmit at least one signal (i.e., signal 110).

Although specific processes for disconnecting power to an external device are discussed above with respect to FIG. 7A and FIG. 7B, any of a variety of processes for disconnecting power to the external device 400 (as appropriate to the requirements of a specific application) can be utilized in accordance with embodiments of the present disclosure.

Location Identification Processes Utilizing a Unique Location Identification Signal In many embodiments, a unique location identification signal 114 can be utilized to identify the location of the external device 400. A flow chart illustrating a process for determining the location of the variable power source attachment 500 connected to the external device 400, in accordance with an embodiment of the invention, is shown in FIG. 7C. The process 750 includes the variable power source attachment 500 receiving at least one signal from the companion unit 300 (in step 752). Once at least one signal from the companion unit 300 is received (in step 752), the variable power source attachment 500 sends a unique location identification signal 114 to the companion unit 300 (in step 754) for purposes of determining the location of the device 400 by means of signal proximity.

In another embodiment, at least one signal and/or the unique location identification signal 114 may be transmitted using any of the following communication protocol standards: (a) wireless local area networks (WLANs, such as Wi-Fi) and/or (b) wireless personal area networks (WPANs, such as wireless USB, BLUETOOTH®, X-BEE®, ZIGBEE®) and/or (c) cellular telephone communications (such as short message service (SMS) and multimedia messaging service (MMS)) and/or (d) any other wireless protocol, such as IEEE 802.11 or its subsequent versions. In some embodiments, the unique location identification signal 114 may be transmitted to the companion unit 300 or an individual's mobile device, such as a cellular telephone.

In another embodiment, the external device may be the correctional collar 400.

Although specific processes for location identification of the variable power source attachment 500 connected to an external device 400 are discussed above with respect to FIG. 7C, any of a variety of processes for location identification of the variable power source attachment 500 connected to the external device 400 (as appropriate to the requirements of a specific application) can be utilized in accordance with embodiments of the present disclosure.

Correctional Collar with Variable Power Source Attachment

In many embodiments, the variable power source attachment 500 attaches to the power source 412 within the correctional collar 400. A system 100 including the variable power source attachment 500 configured in the correctional collar 400, in accordance with an embodiment of the present disclosure, is shown in more detail in FIG. 8. The system 100 including the correctional collar 400 with the variable power source attachment 500 may include the correctional collar housing 401 for containing the components of the correctional collar 400. In many embodiments, the correctional collar housing 401 may house the correction mechanism 440 that is configured to deliver a correctional stimulus to the wearer (108, as shown in FIG. 1) of the correctional collar 400.

In several embodiments, the correctional collar housing 401 may also house a battery chassis 810 for housing the power source 412. In many embodiments, the battery chassis 810 may be capable of accommodating both the power source 412 and the variable power source attachment 500.

In some embodiments, the correctional collar housing 401 may include the negative terminal 510 of the correction mechanism 440 and the positive terminal 504 of the correction mechanism 440.

In many embodiments, the variable power source attachment 500 may include the positive terminal 512 of the first side 502, the negative terminal 506 of the first side 502, the positive terminal 542 of the second side 503, the negative terminal 522 of the second side 503, and the processing module 560. In several embodiments, the variable power source attachment 500 may attach to the power source 412 so that the negative terminal 522 of the second side 503 may connect to the positive terminal 524 of the power source 412, and the positive terminal 542 of the second side 503 may connect to the negative terminal 544 of the power source 412.

In various embodiments, the variable power source attachment 500, while attached to the power source 412, may then be inserted into the battery chassis 810 where the positive terminal 512 of the first side 502 may connect to the negative terminal 510 of the correction mechanism 440, and the negative terminal 506 of the first side 502 may connect to the positive terminal 504 of the correction mechanism 440.

In many embodiments, the negative terminal of the correction mechanism 504 may be connected to the correction mechanism 440 by means of a correction mechanism power flow 806 which may allow power to flow from the variable power source attachment 500 to the correction mechanism 440.

In many embodiments, the variable power source attachment 500, while attached to the power source 412, may be situated between the power source 412 and the correction mechanism power flow 806. In various embodiments, the variable power source attachment 500 may be capable, by means of the components (e.g., the relay 558) housed in the processing module 560, of disconnecting power flow from the power source 412 to the negative terminal 504 of the correction mechanism 440, which may ensure that no power flows through the correction mechanism power flow 508 and that the correction mechanism 440, therefore, is unable to deliver a correctional stimulus to the wearer (108).

Although specific devices for disconnecting power flow to the correction mechanism 440 using the present variable power source attachment 500 are discussed above with respect to FIG. 8, any of a variety of devices for disconnecting power flow to the correction mechanism using a variable power source attachment (as appropriate to the requirements of a specific application) can be utilized in accordance with embodiments of the present disclosure.

While the above description contains many specific embodiments of the present technology, these should not be construed as limitations on the scope of the technology, but rather as examples of embodiments thereof. It is therefore to be understood that the present technology may be practiced otherwise than specifically described, without departing from the scope and spirit of the present disclosure. Thus, embodiments presented herein should be considered in all respects as illustrative and not restrictive.

What is claimed is:

1. A variable power source attachment for providing power to a correctional collar for an animal, the variable power source attachment comprising:
   a first pair of electrical terminals coupled to an oppositely disposed first pair of electrical contacts of the correctional collar, the first pair of electrical terminals having a positive terminal and a negative terminal;
   a second pair of electrical terminals coupled to an oppositely disposed second pair of electrical contacts of a power source, the second pair of electrical terminals having a positive terminal and a negative terminal, such that a coupling of the first pair of electrical terminals and second pair of electrical terminals to the respective first pair of electrical contacts and second pair of electrical contacts completes an electrical circuit;
   a relay disposed between the first pair of electrical terminals and the second pair of electrical terminals, the relay defining a closed position completing the electrical circuit and an open position disrupting the electrical circuit and thereby terminating power flow to the correctional collar;
   a processing module comprising: a communication module with a receiver configured to receive at least one signal indicating a smoke alarm has been activated; and a processor configured to switch the relay from the closed position to the open position, upon receipt of the at least one signal.

2. The variable power source attachment of claim 1, wherein the correctional collar comprises a correction mechanism to deliver a correction stimulus.

3. The variable power source attachment of claim 2, wherein the correction stimulus is selected from the group consisting of an electric correction stimulus, a vibration correction stimulus, a sound correction stimulus, and a chemical spray correction stimulus.

4. The variable power source attachment of claim 1, further comprising a magnetic coil configured to generate a magnetic field; and wherein the relay is an electromagnetic relay configured to move between the closed position and the open position responsive to the magnetic field.

5. The variable power source attachment of claim 1, wherein the relay switch is a MOSFET.

6. The variable power source attachment of claim 1, wherein the communication module further comprises a transmitter for transmitting a unique location identification signal used to determine the location of the correctional collar, using signal proximity.

7. The variable power source attachment of claim 1, wherein the correctional collar comprises a microphone; and wherein the at least one signal indicating that the smoke alarm has been activated is a Temporal-Three alarm signal detected by the microphone.

8. The variable power source attachment of claim 1, wherein the at least one signal indicating that the smoke alarm has been activated is a companion unit signal.

9. The variable power source attachment of claim 1, wherein the power source is a 6-volt power source or a 9-volt power source.

10. The variable power source attachment of claim 9, wherein the power source is disposed in the correctional collar.

11. The variable power source attachment of claim 1, wherein the variable power source attachment draws power from the power source.

12. A method for disconnecting power to a correctional collar for an animal using a variable power source attachment coupled to the correctional collar, the method comprising:
   receiving at least one signal indicating that a smoke alarm has been activated using a receiver of a communication module of the variable power source attachment, wherein the variable power source attachment comprises:
      a first pair of electrical terminals coupled to an oppositely disposed first pair of electrical contacts of the correctional collar, the first pair of electrical terminals having a positive terminal and a negative terminal;
      a second pair of electrical terminals coupled to an oppositely disposed second pair of electrical contacts of a power source, the second pair of electrical terminals having a positive terminal and a negative terminal, such that a coupling of the first pair of electrical terminals and second pair of electrical terminals to the respective first pair of electrical contacts and second pair of electrical contacts completes an electrical circuit;

a processing module comprising the communication module; and a relay positioned between the first pair of electrical terminals and the second pair of electrical terminals; and switching the relay from a closed position to an open position upon receiving the at least one signal indicating that the smoke alarm has been activated, thereby disconnecting the flow of current between the first pair of electrical terminals and the second pair of electrical terminals.

13. The method of claim 12, wherein the correctional collar comprises a correction mechanism to deliver a correction stimulus; and wherein the switching of the relay from the closed position to the open position disconnects the flow of current to the correction mechanism.

14. The method of claim 12, wherein the switching of the relay between the closed position and the open position is accomplished using a magnetic field generated by a magnetic coil in the variable power source attachment.

15. The method of claim 12, wherein the relay is a MOSFET.

16. The method of claim 12, further comprising generating a Temporal-Three smoke alarm signal, via the smoke alarm; detecting the Temporal-Three smoke alarm signal using a microphone of the correctional collar; and transmitting to the communication module the detected signal as the at least one signal indicating that the smoke alarm has been activated.

17. The method of claim 12, further comprising generating a companion unit signal using a companion unit to the smoke alarm, the companion unit signal being the at least one signal indicating that the smoke alarm has been activated.

18. The method of claim 12, wherein the power source is a 6-volt power source or a 9-volt power source.

19. The method of claim 12, further comprising providing the power source in the correctional collar.

20. The method of claim 12, further comprising, prior to the receiving of the at least one signal indicating that the smoke alarm has been activated, directing power from the power source to the variable power source attachment.

* * * * *